(12) United States Patent
Matsuura et al.

(10) Patent No.: US 6,744,944 B2
(45) Date of Patent: Jun. 1, 2004

(54) OPTICAL COUPLING MODULE HAVING A FIRST AND SECOND FERRULES

(75) Inventors: Hiroshi Matsuura, Tokyo (JP); Mieko Konishi, Tokyo (JP); Katsuki Suematsu, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 10/029,556

(22) Filed: Dec. 20, 2001

(65) Prior Publication Data

US 2003/0068121 A1 Apr. 10, 2003

(30) Foreign Application Priority Data

Oct. 5, 2001 (JP) ........................... 2001-310351

(51) Int. Cl.[7] ................................................. G02B 6/26
(52) U.S. Cl. ........................... 385/24; 385/15; 385/31; 385/33
(58) Field of Search ................................ 385/11, 15, 24, 385/31–35

(56) References Cited

U.S. PATENT DOCUMENTS

| | | | | |
|---|---|---|---|---|
| 4,989,946 A | * | 2/1991 | Williams et al. | 385/16 |
| 5,390,270 A | * | 2/1995 | Hanzawa et al. | 385/81 |
| 5,682,452 A | * | 10/1997 | Takahashi | 385/85 |
| 5,692,081 A | * | 11/1997 | Takahashi | 385/78 |
| 5,751,875 A | * | 5/1998 | Edwards et al. | 385/84 |
| 5,975,770 A | * | 11/1999 | Yanagi et al. | 385/78 |
| 6,048,102 A | * | 4/2000 | Fukushima | 385/72 |
| 6,249,625 B1 | * | 6/2001 | Pan | 385/43 |
| 6,343,166 B1 | * | 1/2002 | Hellman et al. | 385/31 |
| 6,435,731 B1 | * | 8/2002 | Yamaguchi et al. | 385/78 |
| 6,447,173 B1 | * | 9/2002 | Takada et al. | 385/78 |
| 6,498,876 B1 | * | 12/2002 | Liu et al. | 385/34 |
| 6,533,469 B1 | * | 3/2003 | Nakamura et al. | 385/84 |
| 2002/0037140 A1 | * | 3/2002 | Ishibashi et al. | 385/78 |
| 2002/0081066 A1 | * | 6/2002 | Brun et al. | 385/34 |

FOREIGN PATENT DOCUMENTS

JP 61070521 A * 4/1986 .......... G02B/26/02

* cited by examiner

*Primary Examiner*—John D. Lee
(74) *Attorney, Agent, or Firm*—Knobbe, Martens, Olson & Bear, LLP

(57) ABSTRACT

An optical multiplexer/demultiplexer wherein an optical fiber, attached to a ferrule, for receiving and outputting light, a lens member 4 and an optical component are optically coupled. The ferrule is formed of a synthetic resin and has at least one fiber hole formed therein.

30 Claims, 10 Drawing Sheets

OPTICAL COUPLING MODULE HAVING A FIRST AND SECOND FERRULES

FIELD OF THE INVENTION

The present invention relates to an optical multiplexer/demultiplexer for use in optical communications and optical measuring.

BACKGROUND OF THE INVENTION

In a ferrule used in an optical multiplexer/demultiplexer, a capillary for fixing an optical fiber is formed of glass or zirconia.

A glass capillary is produced by drawing heated glass and cutting it. A wire is put through a fiber hole of the capillary, then an abrasive is fed there to polish inside and the outside of the capillary is ground to yield a predetermined standardized product. A zirconia capillary after sintering is pressed into a part, thereby yielding a ferrule. To provide a predetermined standardized product, the zirconia capillary is subjected to the same treatments as the glass capillary undergoes.

Because an optical multiplexer/demultiplexer according to the related art has a capillary produced in the above-described manner, the processing takes time and labors, making the ferrule expensive, disadvantageously.

Because the fiber hole of the capillary is polished, when there are plural fiber holes, it is hard to achieve parallelism between the fiber holes. In an optical multiplexer/demultiplexer assembled with a ferrule using such a capillary, the directions of beams incident to light incident fibers or the directions of beams outputting from light output fibers differ from one another. This leads to a large coupling loss to other optical components.

A capillary may be used in an optical multiplexer/demultiplexer in which a plurality of fiber holes, e.g., two fiber holes, laid side by side with the pitch between the fiber holes set to the diameter of an optical fiber and lights outputting from both optical fibers are incident to an optical filter via a lens.

In such an optical multiplexer/demultiplexer, the optical axes of the two optical fibers are shifted from the center of the capillary and thus from the optical axis of the lens, the incident angle of the beam that enters the optical filter through the lens becomes large, thus increasing a PDL (Polarization Dependent Loss). When the focal length of the lens is 1.8 mm, for example, the angle of incidence to the optical filter becomes 4 degrees.

Such an undesirable increase in PDL occurs even in case of a single optical fiber when the optical axis of the optical fiber is shifted from the optical axis of the lens so that the incident angle of a beam incident to the optical filter becomes larger.

Another problem arises when the fiber holes are laid out close to one another. At the time the capillary undergoes a treatment, such as polishing, the walls of the adjoining fiber holes may be broken and linked together.

SUMMARY OF THE INVENTION

Accordingly, it is an object of the present invention to provide an optical multiplexer/demultiplexer which allows a fiber hole to be formed with a high precision and can suppress a PDL to a low level.

To achieve the above object, according to the present invention, there is provided an optical multiplexer/demultiplexer wherein an optical fiber, attached to a ferrule, for receiving and outputting light, a lens member and an optical component are optically coupled, the ferrule being formed of a synthetic resin and having at least one fiber hole formed therein.

The above object and other objects, the features and advantages of the present invention will become more apparent from the detailed description given hereinafter in conjunction with the accompanying drawings.

DETAILED DESCRIPTION

One embodiment of an optical multiplexer/demultiplexer according to the present invention will now be described in detail with reference to FIGS. 1A through 21.

Figure 1A:
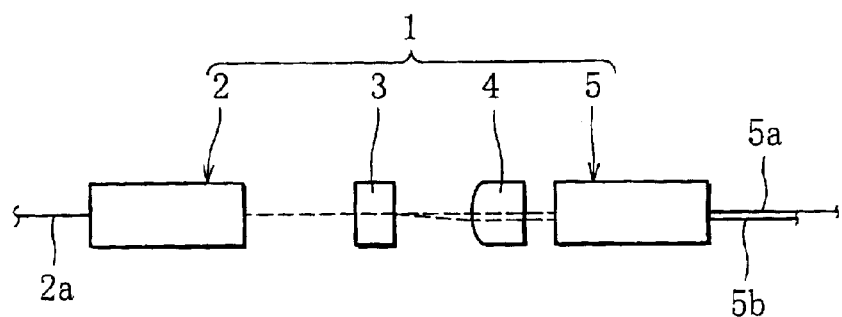
FIG. 1A is a side view showing one embodiment of an optical multiplexer/demultiplexer according to the present invention.

An optical multiplexer/demultiplexer 1 has a first ferrule 2, an optical component 3, a lens 4 and a second ferrule 5 as shown in FIG. 1A.

The first ferrule 2 is a singlefiber ferrule to which a single optical fiber 2a is attached, and is formed of a synthetic resin, such as a thermoplastic epoxy resin, or engineering plastics such as a thermosetting polyphenylene sulfide (PPS), or engineering plastics having a low mold shrinkage of 1.0% or less obtained by allowing the former engineering plastics to contain a filler, such as at least 60% by weight of silica or metal oxide, by a molding method, such as insert molding, transfer molding or injection molding.

The optical component 3 is, for example, a narrow-band pass filter comprising a dielectric multilayer coating having the maximum transmittance at a specific wavelength and is designed to be able to make the PDL smaller as the incident angle approaches 0° or as the incident angle to the filter approaches 0°. The optical component 3 may be a birefringent crystal plate, a Faraday rotator, a λ/2 wave plate or the like.

The lens 4 is, for example, an aspherical lens having a focal length of about 1.8 mm. Though not shown in FIG. 1A, a lens having the same function as the lens 4 may be provided between the first ferrule 2 and the optical component 3.

The second ferrule 5 has optical fibers 5a and 5b which are laid out with a pitch of 127 μm therebetween so that the incident angle of light incident to the optical component 3 approaches as close to 0° as possible. The position of the second ferrule 5 is adjusted in such a way that the optical fiber 5a is positioned on the same axis as the optical fiber 2a. Like the first ferrule 2, the second ferrule 5 is formed of a synthetic resin.

The optical multiplexer/demultiplexer 1 constructed in the above-described manner, for example, may serve as a demultiplexer which functions in such a way that when wavelength-multiplexed light consisting of lights of multiple wavelengths transmitted through the optical fiber 5a is condensed by the lens 4 and is led to the optical component 3, the optical component 3 passes light of a specific wavelength and reflects lights of other wavelengths, and the reflected lights are condensed again by the lens 4 and led out to the optical fiber 5b.

The optical multiplexer/demultiplexer 1 also functions as a multiplexer, where a light of a specific wavelength (wavelength λ1) out of the wavelength-multiplexed light transmitted through the optical fiber 2a of the first ferrule 2 is transmitted through the optical component 3, and a light (wavelength λ2) transmitted through the optical fiber 5b is reflected by the optical component 3, so that both lights are multiplexed and go out of the optical fiber 5a as a light having wavelengths λ1, λ2.

The first and second ferrules 2 and 5, unlike those in the optical multiplexer/demultiplexer of the related art, do not use glass or zirconia capillary and are formed of a synthetic resin. Therefore, the fiber holes of the optical fibers 2a and 5a of the first and second ferrules 2 and 5 can be formed with a high precision, so that the optical axes of the optical fibers 2a and 5a are not deviated from the optical axis of the lens 4. This can reduce the incident angle of light entering the optical component 3 through the lens 4, thereby suppressing the PDL of the optical multiplexer/demultiplexer 1 at a low level.

Figure 1B:
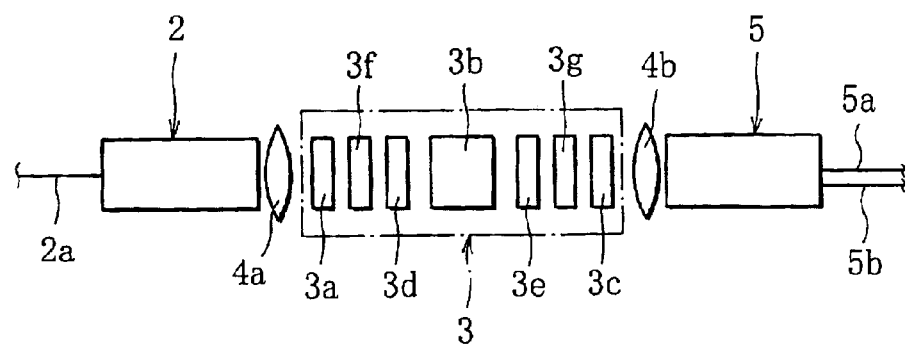
FIG. 1B is a side view showing a modification of the optical multiplexer/demultiplexer according to the present invention.

The optical component 3 comprises, for example, birefringent crystal plates 3a to 3c, Faraday rotators 3d and 3e and λ/2 wave plates 3f and 3g and lens 4a and 4b are used in place of the lens 4, as shown in FIG. 1B.

This structure can allow the optical multiplexer/demultiplexer 1 to serve as an optical circulator which emits light coming from the optical fiber 5a to the optical fiber 2a and emits light coming from the optical fiber 2a to the optical fiber 5b. Though unillustrated, a prism which changes the optical path may be arranged between the lens 4b on that side of the second ferrule 5 and the birefringent crystal plate 3c.

The ferrule used in the optical multiplexer/demultiplexer 1 of the present invention is formed of a synthetic resin and should have at least one fiber hole. Therefore, various ferrules which will be discussed hereinunder can be used.

Figure 2:
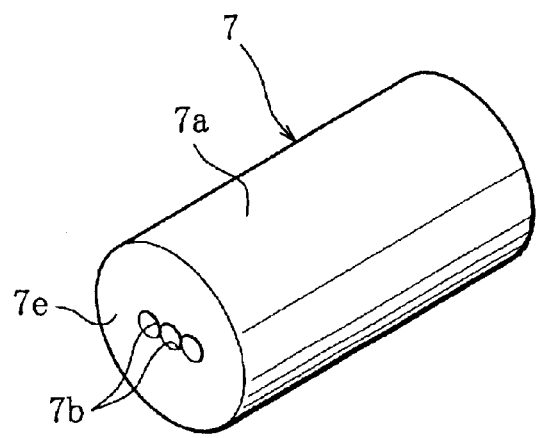
FIG. 2 is a perspective view of a ferrule to be used in the optical multiplexers/demultiplexers in FIGS. 1A and 1B.
Figure 3A:
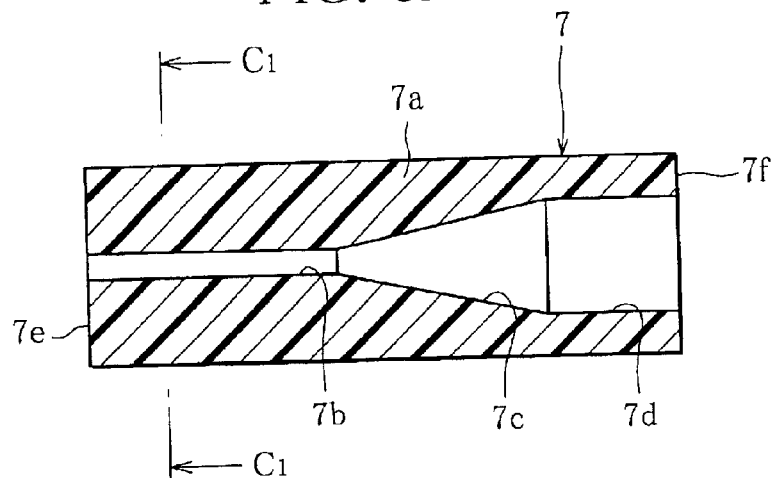
FIG. 3A is a cross-sectional view of the ferrule in FIG. 2 cut along the center.
Figure 3B:
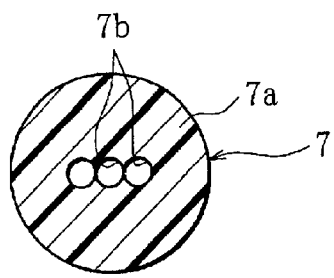
FIG. 3B is a cross-sectional view of the ferrule cut along the line C1—C1 in FIG. 3A.

First, three fiber holes 7b and guide holes 7d linked to the fiber holes 7b via tapered holes 7c are formed in a cylindrical body 7a of a ferrule 7 shown in FIG. 2 and FIGS. 3A and 3B in the lengthwise direction. The ferrule 7 has a front face 7e which is an end face on that side where the fiber holes 7b are provided, and a rear face 7f which is an end face on that side where the guide holes 7d are provided. Optical fibers are to be inserted in the rear face 7f. It is to be noted that the ferrule has only to have at least one fiber hole 7b together with its associated single tapered hole 7c and single guide hole 7d.

The ferrule 7 is formed of a synthetic resin, such as a thermoplastic epoxy resin, or engineering plastics such as a thermosetting polyphenylene sulfide (PPS), or engineering plastics having a low mold shrinkage of 1.0% or less obtained by allowing the former engineering plastics to contain a filler, such as at least 60% by weight of silica or metal oxide, by a molding method, such as insert molding, transfer molding or injection molding.

Of the engineering plastics, a transparent or semitransparent one is used for the ferrule 7. The use of this material is preferable as a worker can conduct a work of inserting an optical fiber into the fiber hole 7b through the guide hole 7d and securely adhering it while visually observing the work at the time of assembling the optical multiplexer/demultiplexer.

The ferrule 7 may have its outer surface plated with nickel, nickel-chromium-gold, nickel-gold or the like. Such plating is preferable as it can allow the ferrule 7 to be soldered.

Because the diameter, d, of the fiber hole 7b lies within the designed range of d=0.124 to 0.250 mm to match with the diameter of the optical fiber to be adhered, the diameter d is so set as to minimize the amount of a required adhesive. If the positional precision of the fiber hole 7b is expressed in terms of a positional tolerance T, the positional tolerance T lies within a range of ±0.005 mm in the employed molding method.

Figure 4:
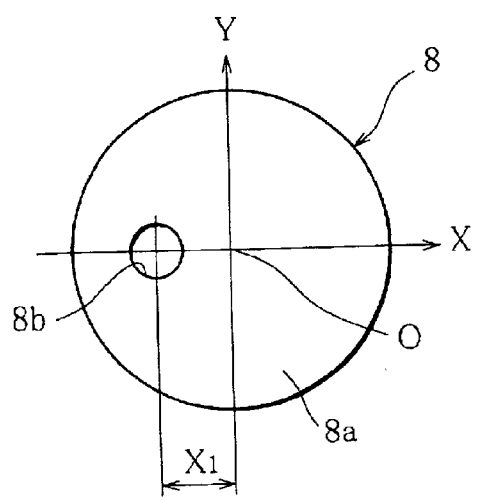
FIG. 4 is a front view for explaining the position of a fiber hole in a ferrule with a single fiber hole in connection with the designed value and a positional tolerance.

In a case where the ferrule has a single fiber hole like a ferrule 8 shown in FIG. 4, for example, the X axis and Y axis perpendicular to each other are set as illustrated with the center of a body 8a being the original point O. The position X1 of a center position of a fiber hole 8b on the X axis is given by the following equation:

$$X1=A+T$$

where A is the design value (=0 to 0.3 mm) and T is the positional tolerance.

In the optical multiplexer/demultiplexer that uses the ferrule 8, the ferrule 8 and a lens located apart from the ferrule 8 by a predetermined distance are set in such a way that the center of the fiber hole 8b and the optical axis of the lens pass the original point O and lies on the axis perpendicular to the sheet of FIG. 4. With this design, the optical multiplexer/demultiplexer using the ferrule 8 is ideal in that entering and outputting of a beam which is transmitted through an optical fiber (not shown) securely adhered into the fiber hole 8b and outputs from the optical fiber and a beam which enters the optical fiber from outside take place on the same axis.

By setting the designed value A of the fiber hole 8b of the ferrule 8 to any value from 0 to 0.3 mm, the fiber hole 8b is offset adequately from the original point O in FIG. 4 so that a beam can enter and output from the optical fiber at a desirable angle.

Figure 5:
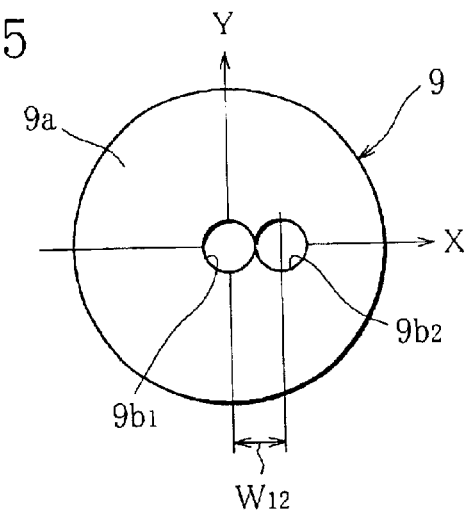
FIG. 5 is a front view for explaining the positions of fiber holes in a ferrule with two fiber holes in connection with the designed value and a positional tolerance.
Figure 6:
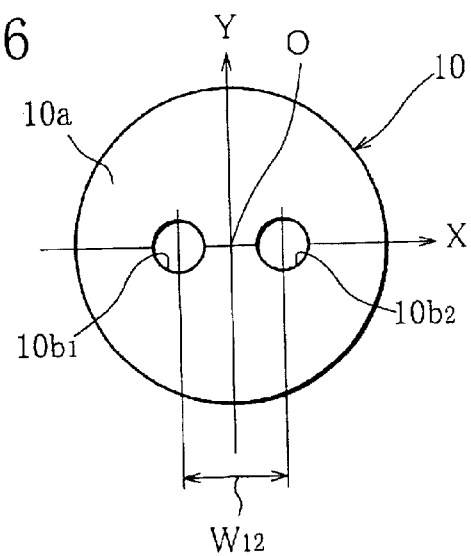
FIG. 6 is a front view for explaining the positions of fiber holes in a ferrule which has two fiber holes symmetrically formed with a predetermined distance therebetween in connection with the designed value and a positional tolerance.

In a case where two fiber holes, for example, are formed in the ferrule of the optical multiplexer/demultiplexer 1 of the present invention, the ferrule is formed in such a way as to be a ferrule 9 shown in FIG. 5 or a ferrule 10 shown in FIG. 6.

In case of the ferrule 9 shown in FIG. 5, with the center of a body 9a being the original point O, a fiber hole 9b1 is formed at the position of the original point O and a fiber hole 9b2 is formed at a position offset by a distance W12 from the center of the fiber hole 9b1.

The degree of parallelization of the fiber holes 9b1 and 9b2 is set to 3 or smaller. As the center of the fiber hole 9b1 is the original point O, the designed value A of the fiber hole 9b1 is equal to 0, so that with T being the positional tolerance, the position X2 of the fiber hole 9b1 on the X axis is given by the following equation:

$$X2=T$$

Given that the designed value is A (=0 to 0.3 mm) and the positional tolerance is T and the diameters of the fiber holes 9b1 and 9b2 are respectively d1 and d2 (=0.124 to 0.250 mm), the distance, W12, between the fiber holes 9b1 and 9b2 is given by the following equation:

$$W12=(d1/2)+(d2/2)+A+T$$

In case of the ferrule 10 shown in FIG. 6, with the center of a body 10a being the original point O, fiber holes 10b1 and 10b2 are formed at symmetrical positions with respect to the original point O. The distance W12 between the fiber holes 10b1 and 10b2 takes an arbitrary value, and the degree of parallelization of the fiber holes 10b1 and 10b2 is set to 3 or smaller as in the previous case.

Given that the designed value of the fiber hole 10b1 is A (=0 to 0.3 mm), the designed value of the fiber hole 10b2 is B (=0 to 0.3 mm), the positional tolerance is T and the diameters of the fiber holes 10b1 and 10b2 are respectively d1 and d2 (=0.124 to 0.250 mm), the position X1 and X2 of the fiber holes 10b1 and 10b2 on the X axis and the distance W12 between the fiber holes 10b1 and 10b2 are given by the following equations:

$$X1=(d1/2)+A+T$$

$$X2=(d2/2)+B+T$$

$$W12=(d1/2)+(d2/2)+A+B+T$$

Figure 7:
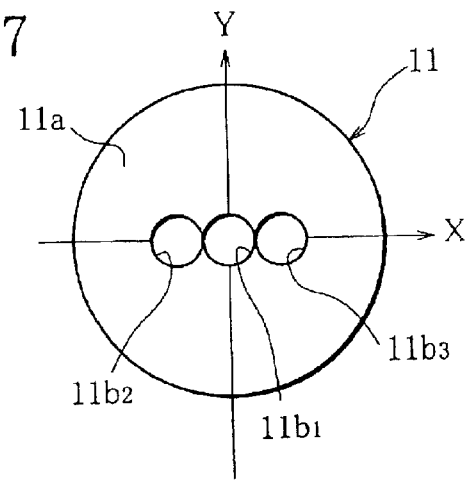
FIG. 7 is a front view for explaining the positions of fiber holes in a ferrule which has three fiber holes symmetrically formed with the middle fiber hole in the center in connection with the designed value and a positional tolerance.

In a case where there are three fiber holes, the ferrule is formed like a ferrule 11 shown in FIG. 7.

In case of the ferrule 11 shown in FIG. 7, with the center of a body 11a being the original point O, a fiber hole 11b1 is formed at the position of the original point O and fiber holes 11b2 and 11b3 are formed at positions symmetrical to each other with respect to the original point O and adjacent to the fiber hole 11b1. As in the previous cases, the degree of parallelization of the fiber holes 11b1 to 11b3 is set to 3 or smaller.

Figure 8:
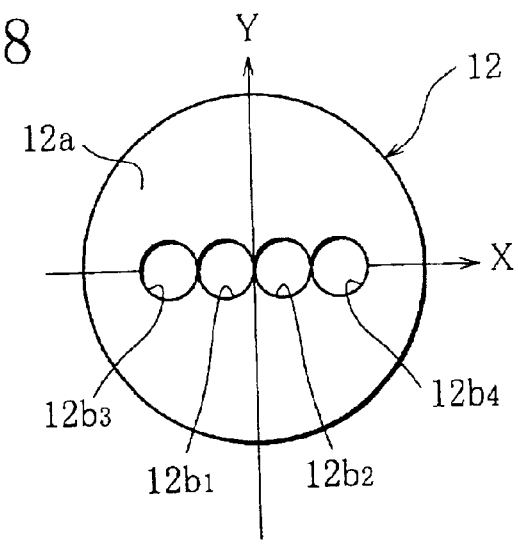
FIG. 8 is a front view for explaining the positions of fiber holes in a ferrule which has four fiber holes formed symmetrically with respect to the center in connection with the designed value and a positional tolerance.

In a case where there are four fiber holes, the ferrule is formed like a ferrule 12 shown in FIG. 8.

In case of the ferrule 12 shown in FIG. 8, with the center of a body 12a being the original point O, fiber holes 12b1 and 12b2 are formed adjacent and symmetrical to each other with respect to the original point O and fiber holes 12b3 and 12b4 are formed at positions outside and adjacent to the fiber holes 12b1 and 12b2 and symmetrical to each other with respect to the original point O. As in the previous cases, the degree of parallelization of the fiber holes 12b1 to 12b4 is set to 3 or smaller.

In a case where the ferrule to be used in the optical multiplexer/demultiplexer 1 of the present invention has an odd number of fiber holes as a total, when one fiber hole is formed at the original point O, the other fiber holes are formed at positions symmetrical to one another with respect to the original point O. In a case where the ferrule has an even number of fiber holes as a total, all the fiber holes are formed at positions symmetrical to one another with respect to the original point O.

Figure 9A:
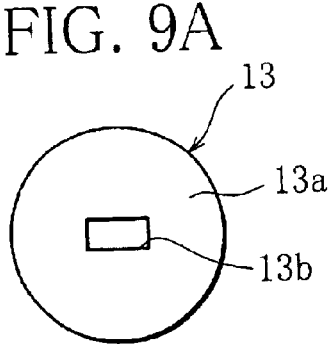
FIGS. 9A to 9D are front views of various forms of a ferrule having two fiber holes unified into one.
Figure 9B:
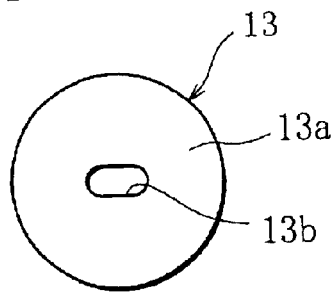
Figure 9C:
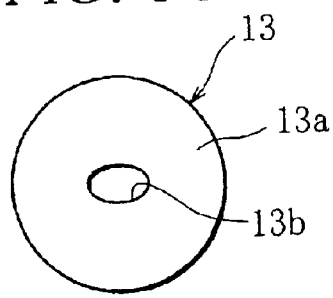
Figure 9D:
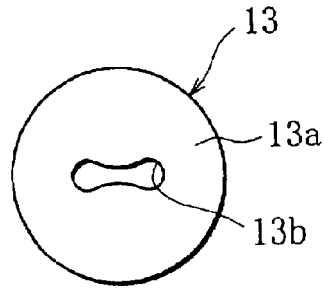

When the fiber holes, for example, two fiber holes are formed at positions symmetrical to one another with respect to the original point O, the fiber holes may be formed like a rectangular fiber hole 13b of a ferrule 13 shown in FIG. 9A which is large enough to retain two optical fibers, or may be formed like an elongated fiber hole 13b with rounded corners shown in FIG. 9B which is equivalent to two fiber holes joined together. Alternatively, the fiber holes may be formed like an ellipsoidal fiber hole 13b shown in FIG. 9C which is so designed that two optical fibers are insertable, or may be formed like a center-dented elongated fiber hole 13b shown in FIG. 9D which is acquired by joining two fiber holes located apart from each other by a predetermined distance.

Figure 10:
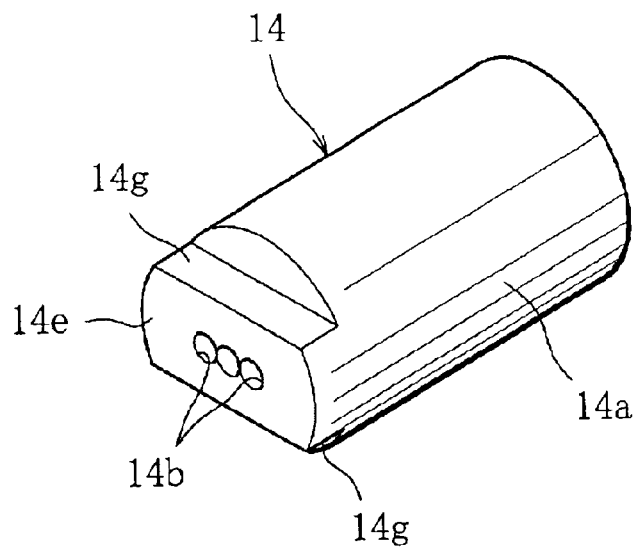
FIG. 10 is a perspective view showing a modification of the ferrule to be used in the optical multiplexers/demultiplexers in FIGS. 1A and 1B.

In a case where the ferrule is of a type where a plurality of optical fibers are secured into respective fiber holes, a step 14g is formed in a front face 14e of a body 14a as in a ferrule 14 shown in FIG. 10. With the step 14g of the ferrule 14 used as a marking, one can easily see the layout direction of a plurality of optical fiber holes 14b, i.e., the layout direction of a plurality of optical fibers that are securely adhered into the fiber holes 14b.

Figure 20:
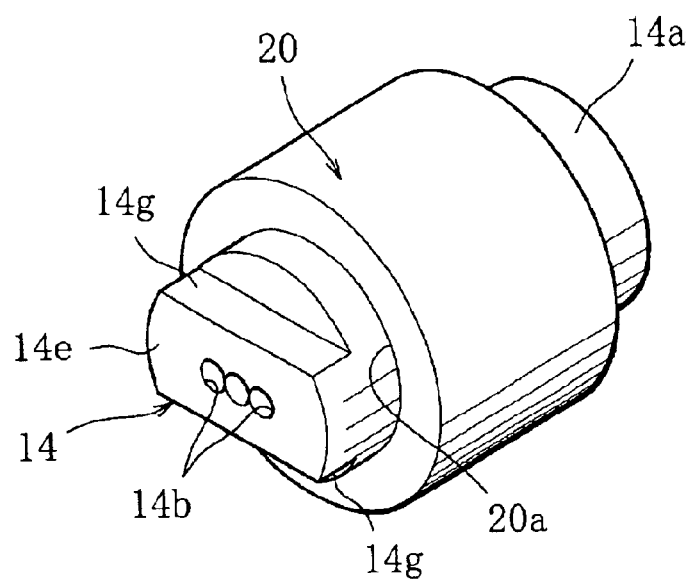
FIG. 20 is a perspective view showing a modification of the ferrule in FIG. 10 provided with a jacket.

The ferrule 14 may be provided on its outer surface with a metal jacket 20 as shown in FIG. 20.

The jacket 20 is formed into a cylinder having a ferrule hole 20a by metal injection and is provided to attach the ferrule 14 to another member by soldering or welding using a YAG laser or the like. To facilitate soldering or welding, therefore, an alloy, such as a copper-tungsten alloy, stainless steel (SUS 304), nickel-iron-cobalt alloy, besides a metal, such as aluminum, copper or tungsten, is used for the jacket 20.

Soldering becomes easier if the surface of the jacket 20 is plated with nickel, nickel-chromium-gold, nickel-gold or the like.

Figure 11:
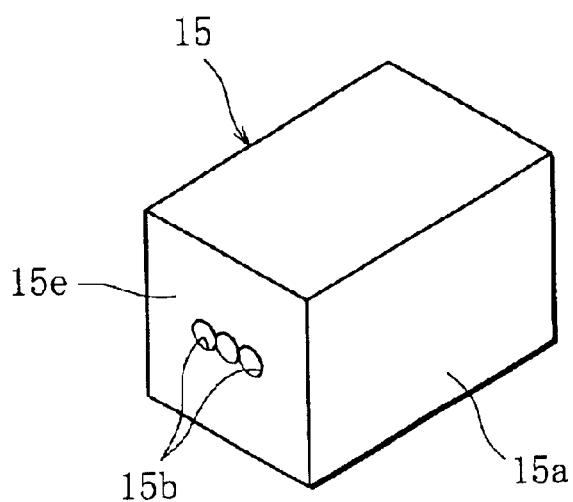
FIG. 11 is a perspective view showing another modification of the ferrule to be used in the optical multiplexers/demultiplexers in FIGS. 1A and 1B.

Depending on the usage, the ferrule for use in the optical multiplexer/demultiplexer 1 of the present invention may be constructed like a ferrule 15 shown in FIG. 11 in such a way that a body 15a is formed into a quadratic prism and plural fiber holes 15b, for example, three fiber holes, and unillustrated plural (e.g., three) guide holes which are linked to the fiber holes 15b via tapered holes (not shown) are formed in the body 15a in the lengthwise direction.

After the ferrule 15 with the above-described structure is formed of the aforementioned engineering plastics by a molding method, such as insert molding, transfer molding or injection molding, optical fibers are secured into the fiber holes 15b by an adhesive and the front end face of the ferrule 15, together with the end faces of the optical fibers, is subjected to optical polishing, thus yielding the optical multiplexer/demultiplexer. At this time, an optical coating, such as an anti-reflection coating or a wavelength selecting coating, with respect to air or the adhesive may be formed on a front face 15e of the ferrule 15 together with the end faces of the optical fibers.

Figure 12:
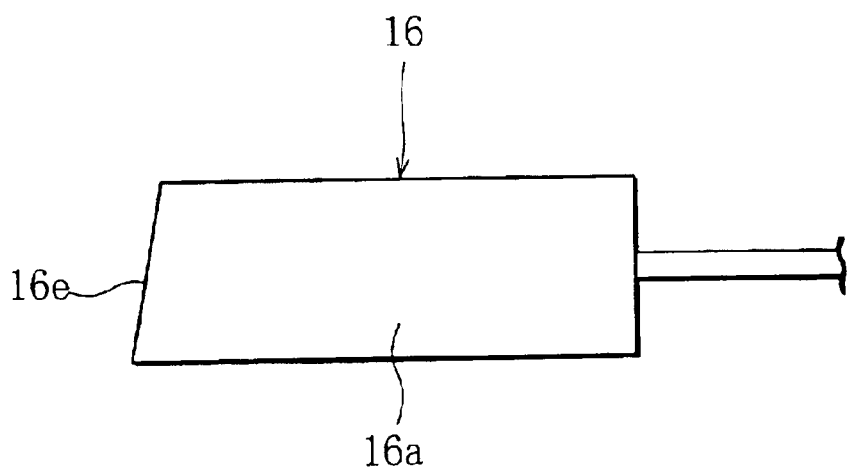
FIG. 12 is a perspective view showing a further modification of the ferrule to be used in the optical multiplexers/demultiplexers in FIGS. 1A and 1B.

In case of a ferrule 16 shown in FIG. 12 as another modification, after optical fibers are secured into the respective fiber holes by an adhesive, a front face 16e of a body 16a is polished obliquely. The use of the thus constituted ferrule 16 can prevent a return loss which is originated from reflection of light transmitted through each optical fiber at the front face 16e.

Figure 21:
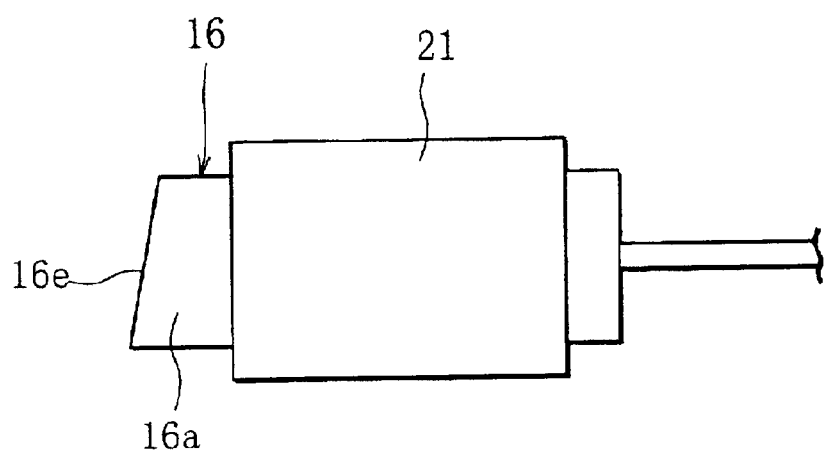
FIG. 21 is a side view showing a modification of the ferrule in FIG. 12 provided with a jacket.

If the ferrule 16 is provided on its outer surface with a metal jacket 21 having a structure similar to that of the jacket 20, as shown in FIG. 21, it becomes easy to attach the ferrule 16 to another member by soldering or welding using a YAG laser or the like. Soldering becomes easier if the surface of the jacket 21 is plated with nickel, nickel-chromium-gold, nickel-gold or the like.

Further, available optical fibers to be secured to the ferrule include single-mode optical fibers, such as a polarization-maintaining single-mode optical fiber, a rare-earth-doped single-mode optical fiber and a rare-earth-doped polarization-maintaining single-mode optical fiber, as well as multi-mode optical fibers.

Figure 13:
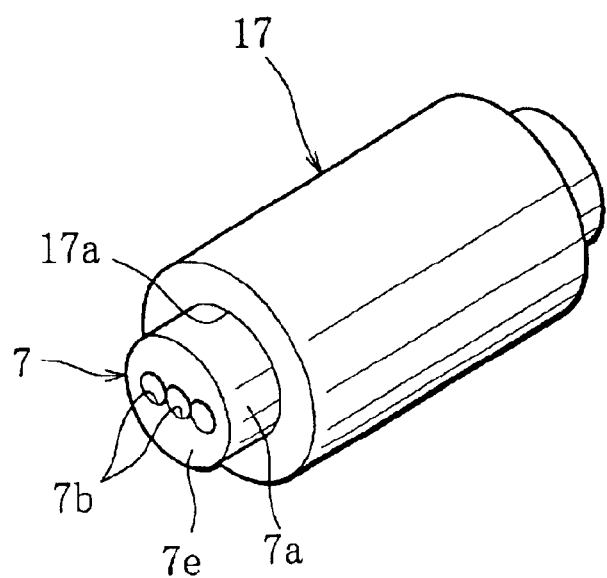
FIG. 13 is a perspective view showing a still further modification of the ferrule to be used in the optical multiplexers/demultiplexers in FIGS. 1A and 1B.

As shown in FIG. 13, a metal jacket 17 may be provided on the outer surface of the ferrule to be used in the optical multiplexer/demultiplexer 1 of the present invention, like the ferrule 7 shown in FIG. 2.

The jacket 17 is formed into a cylinder having a ferrule hole 17a by metal injection and is provided to attach the ferrule 7 to another member by soldering or welding using a YAG laser or the like. To facilitate soldering or welding, therefore, an alloy, such as a copper-tungsten alloy, stainless steel (SUS 304), nickel-iron-cobalt alloy, besides a metal, such as aluminum, copper or tungsten, is used for the jacket 17.

Soldering becomes easier if the surface of the jacket 17 is plated with nickel, nickel-chromium-gold, nickel-gold or the like.

The ferrule 7 constructed in the above-described manner is manufactured by molding the aforementioned engineering plastics in the jacket 17.

At this time, the ferrule 7 according to the embodiment is designed in such a way that grooves or recesses at least 0.005 mm deep, or projections or projecting stripes at least 0.005 mm high are formed in or on the inner surface of the fiber hole 17a of the jacket 17, or the inner face of the jacket 17 is made rough to have a maximum height (Ry) of at least 1 μm. This is a whirl-stop measure that prevents the jacket 17 from turning with respect to the ferrule 7 after production with respect to the shrinkage of the engineering plastics that constitutes the ferrule 7 or the expansion of the jacket 17.

Figure 14A:
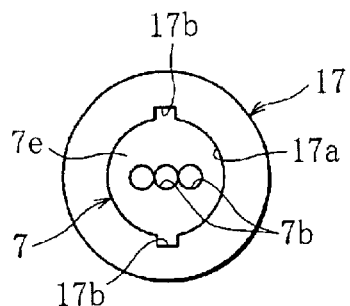
FIGS. 14A to 14D are front views showing various modifications of a jacket for use in the ferrule that is used in the optical multiplexers/demultiplexers in FIGS. 1A and 1B, from the front side of the ferrule.
Figure 14B:
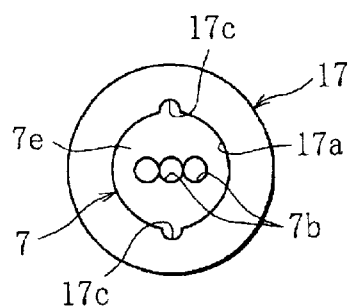
Figure 14C:
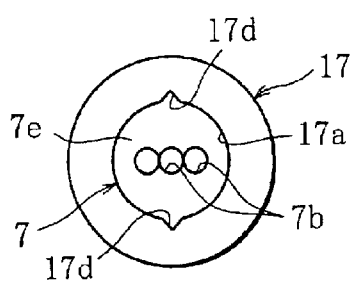
Figure 14D:
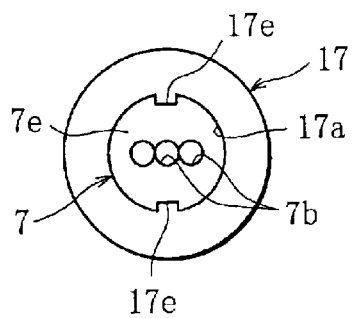

If the ferrule 7 having the jacket 17 has recesses 17b shown in FIG. 14A, elliptical groves 17c shown in FIG. 14B, V grooves 17d shown in FIG. 14C or projecting stripes 17e having rectangular cross sections shown in FIG. 14D formed in or on the inner surface of the ferrule hole 17a over 0.005 mm deep or high in the lengthwise direction, therefore, the structure provides a better whirl-stop measure for the ferrule 7 than the former whirl-stop measure.

The recesses 17b, elliptical grooves 17c, V grooves 17d and projecting stripes 17e may be formed by one pitch spirally or intermittently in the lengthwise direction.

Figure 15A:
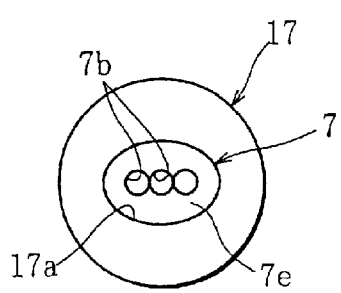
FIGS. 15A to 15C are front views showing various modifications of a jacket with a whirl-stop measure taken with respect to the ferrule.
Figure 15B:
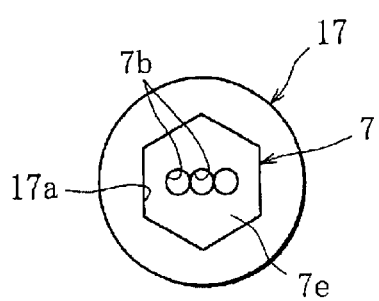
Figure 15C:
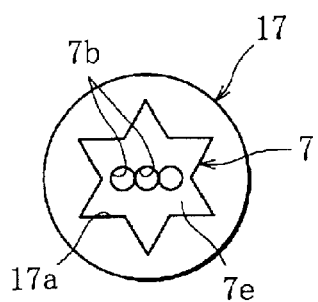

The ferrule 7 according to the present embodiment may be formed in such a way that the cross-sectional shape of the ferrule hole 17a formed in the jacket 17 is formed into a polygonal shape, such as an ellipsis as shown in FIG. 15A, a hexagon as shown in FIG. 15B, or a star as shown in FIG. 15C, the whirl-stop measure of the jacket 17 with respect to the ferrule 7.

Figure 16A:
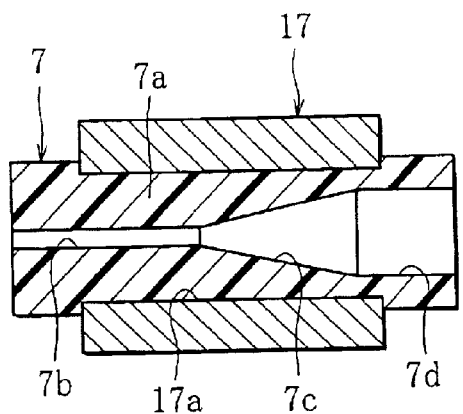
FIGS. 16A and 16B are cross-sectional views showing various modifications of a ferrule with a disengagement stopping measure taken with respect to the jacket, cut along the lengthwise direction of the ferrule.
Figure 16B:
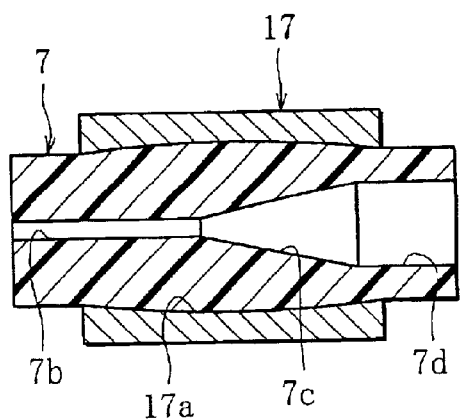

The diameter of the ferrule hole 17a in the jacket 17 is changed in the lengthwise direction in such a way as to be smaller than the diameters of both ends of the ferrule 7 and constant in the lengthwise direction as shown in FIG. 16A or to be larger than the diameter of the ferrule 7 and become maximum at the middle as shown in FIG. 16B. This provides a disengagement stopping measure that prevents the jacket 17 from coming off the ferrule 7 after production with respect to the shrinkage of the engineering plastics that constitutes the ferrule 7 or the expansion of the jacket 17. In this case, in addition to the disengagement stopping measure, grooves or recesses, or projections or projecting stripes as the aforementioned whirl-stop measure may be formed in or on the jacket 17 are formed in or on the inner surface of the jacket 17, or the inner face of the jacket 17 may be made rough to have a maximum height (Ry) of at least 1 μm.

Figure 17:
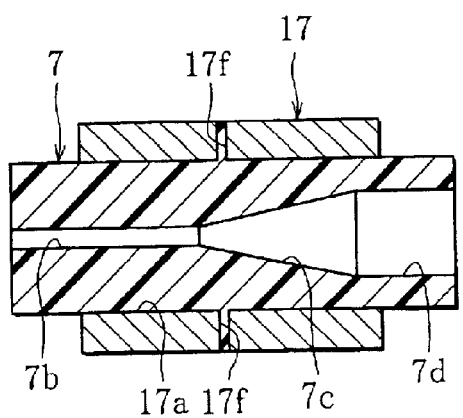
FIG. 17 is a cross-sectional view showing a modification of a ferrule with a whirl-stop measure and a disengagement stopping measure, cut along the lengthwise direction of the ferrule.

If a hole 17f is bored through the jacket 17 in a radial direction as shown in FIG. 17, the engineering plastics enter the hole 17f at the time of molding to thereby demonstrate both effects of whirl-stopping and disengagement stopping of the jacket 17 with respect to the ferrule 7.

Figure 18A:
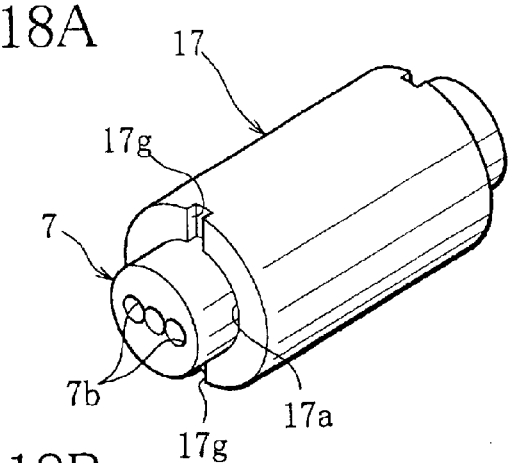
FIG. 18A is a perspective view showing another modification of the ferrule with a whirl-stop measure and a disengagement stopping measure.
Figure 18B:
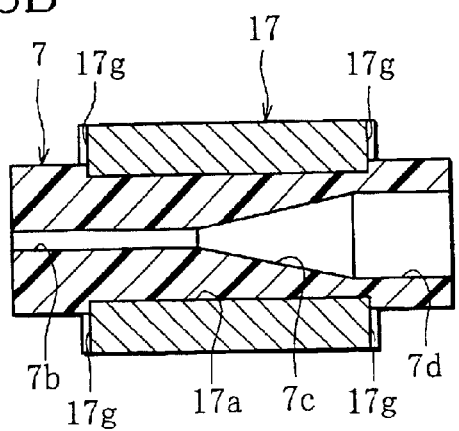
FIG. 18B is a cross-sectional view showing the ferrule in FIG. 18A, cut along the lengthwise direction.

Further, if the jacket 17 is formed in such a way that the diameter of the ferrule hole 17a is smaller than the diameters of both ends of the ferrule 7 and constant in the lengthwise direction and a disengagement stopping groove 17g is radially formed in either lengthwise end of the jacket 17, it is possible to provide both effects of whirl-stopping and disengagement stopping of the jacket 17 with respect to the ferrule 7 as shown in FIGS. 18A and 18B.

Figure 19:
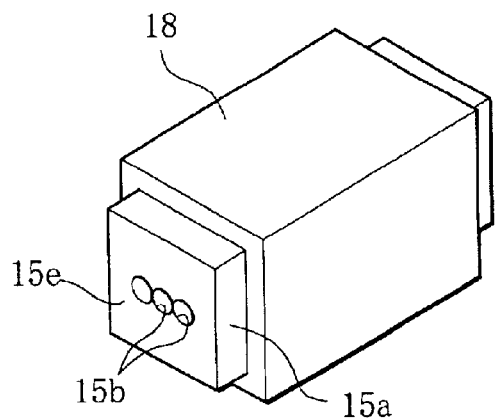
FIG. 19 is a perspective view showing another modification of the ferrule having a jacket.

Like a ferrule shown in FIG. 19, the ferrule to be used in the optical multiplexer/demultiplexer 1 of the present invention may be provided on its outer surface with a metal jacket 18 with a rectangular cylindrical shape as shown in FIG. 11.

Further, the outer shape of the jacket may take a polygonal shape, such as a hexagonal shape, besides a rectangular shape.

What is claimed is:

1. An optical coupling module comprising:
   at least one first optical fiber for receiving or outputting light, said optical fiber having a first end with a first end face;
   a plurality of second optical fibers for transmitting light to or receiving the light from said first optical fiber, said second optical fibers each having a second end with a second end face facing the first end face;
   an optical element inserted between the first end face and the second end faces and adapted to transmit the light between the first end face and the second end faces;
   a first ferrule made of a synthetic resin, for supporting the first end of said first optical fiber, said first ferrule including a first body with a first front end face and a first rear end face, and at least one first through hole formed in the first body, the first through hole extending between the first front and rear end faces and having a first front portion into which the first end of said first optical fiber is received, and a first rear portion being larger than the first front portion; and
   a second ferrule made of a synthetic resin, for supporting each of the second ends of said second optical fibers, said second ferrule including a second body with a second front end face and a second rear end face, and a plurality of second through holes formed in the second body, each of the second through holes extending between the second front and rear end faces and having a second front portion into which the second end of a corresponding one of said second optical fibers is received, and a second rear portion being larger than the second front portion,
   wherein said second through holes open in the second front end face at locations such that said second through holes are separated at respective distances from an optical axis of said first optical fiber, the distances being set depending on function of said optical element.

2. The module according to claim 1, wherein said resin is one selected from the group consisting of a thermoplastic epoxy resin, thermosetting polyphenylene sulfide, and engineering plastics having a low mold shrinkage of 1.0% or less obtained by allowing the former resins to contain at least 60% by weight of silica or metal oxide.

3. The module according to claim 2, wherein said resin is transparent or semitransparent.

4. The module of claim 2, wherein the module part of an optical coupler.

5. The module of claim 2, wherein the module is part of an optical divider.

6. The module of claim 2, wherein the module is part of an optical isolator.

7. The module of claim 2, wherein the module is part of an optical circulator.

8. The module of claim 2, wherein the module is part of an optical multiplexor.

9. The module of claim 2, wherein the module is part of an optical demultiplexor.

10. The optical coupling module according to claim 1, wherein said ferrule is formed cylindrical, a plurality of fiber holes are formed and a pitch between adjoining fiber holes is set to less than 250 $\mu$m.

11. The optical coupling module according to claim 10, wherein a plurality of optical fibers are inserted in said plurality of fiber holes.

12. The optical coupling module according to claim 10, wherein a jacket made of a metal or a non-ferrous metal is provided outside said ferrule.

13. The optical coupling module according to claim 12, wherein said ferrule is formed by insert molding of a synthetic resin and is provided inside said jacket.

14. The optical coupling module according to claim 12, wherein said ferrule and said jacket have rotation preventing means formed thereon.

15. The optical coupling module according to claim 12, wherein an end face of said ferrule is polished obliquely with respect to an optical axis of said optical fiber.

16. The optical coupling module according to claim 12, wherein said ferrule has a step portion formed thereon, said step portion being parallel to a layout direction of said optical fibers.

17. The optical coupling module according to claim 10, wherein an end face of said ferrule is polished obliquely with respect to an optical axis of said optical fiber.

18. The optical coupling module according to claim 10, wherein said ferrule has a step portion formed thereon, said step portion being parallel to a layout direction of said optical fibers.

19. The optical coupling module according to claim 1, wherein a plurality of optical fibers are inserted in said at least one fiber hole.

20. The optical coupling module according to claim 19, wherein a jacket made of a metal or a non-ferrous metal is provided outside said ferrule.

21. The optical coupling module according to claim 20, wherein said ferrule is formed by insert molding of a synthetic resin and is provided inside said jacket.

22. The optical coupling module according to claim 20, wherein said ferrule and said jacket have rotation preventing means formed thereon.

23. The optical coupling module according to claim 19, wherein an end face of said ferrule is polished obliquely with respect to an optical axis of said optical fiber.

24. The optical coupling module according to claim 1, wherein a jacket made of a metal or a non-ferrous metal is provided outside said ferrule.

25. The optical coupling module according to claim 24, wherein said ferrule is formed by insert molding of a synthetic resin and is provided inside said jacket.

26. The optical coupling module according to claim 24, wherein said ferrule and said jacket have rotation preventing means formed thereon.

27. The optical coupling module according to claim 24, wherein said ferrule is provided with a disengagement stopper having at least one portion so formed as to have an outside diameter greater than an inside diameter of said jacket.

28. The optical coupling module according to claim 1, wherein an end face of said ferrule is polished obliquely with respect to an optical axis of said optical fiber.

29. The optical coupling module according to claim 1, wherein said ferrule has a step portion formed thereon.

30. The coupling module according to claim 1, wherein said ferrule is formed into a quadratic prism.

* * * * *